United States Patent
Shin et al.

(10) Patent No.: US 8,001,227 B2
(45) Date of Patent: Aug. 16, 2011

(54) APPARATUS AND METHOD FOR UPNP SERVICE IN PUBLIC NETWORK ENVIRONMENT

(75) Inventors: Dong-yun Shin, Seongnam-si (KR); In-ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 11/771,244

(22) Filed: Jun. 29, 2007

(65) Prior Publication Data

US 2008/0028059 A1   Jan. 31, 2008

(30) Foreign Application Priority Data

Jul. 25, 2006   (KR) .................... 10-2006-0069924

(51) Int. Cl.
*G06F 15/173*   (2006.01)
(52) U.S. Cl. ......... 709/223; 709/224; 709/225; 709/226
(58) Field of Classification Search ........... 709/223–226
See application file for complete search history.

(56) References Cited

U.S. PATENT DOCUMENTS

| | | | |
|---|---|---|---|
| 6,118,759 A * | 9/2000 | Ohyoshi et al. | 370/229 |
| 6,335,939 B1 * | 1/2002 | Hanna et al. | 370/501 |
| 2002/0039366 A1 * | 4/2002 | Sano | 370/390 |
| 2005/0076150 A1 | 4/2005 | Lee et al. | |
| 2005/0240758 A1 | 10/2005 | Lord et al. | |
| 2005/0251549 A1 | 11/2005 | Hlasny | |
| 2006/0072618 A1 * | 4/2006 | Moribe et al. | 370/474 |
| 2007/0071012 A1 * | 3/2007 | Park et al. | 370/395.53 |
| 2007/0127394 A1 * | 6/2007 | Stirbu et al. | 370/254 |

FOREIGN PATENT DOCUMENTS

| | | |
|---|---|---|
| CN | 1452351 A | 10/2003 |
| WO | 2005/076567 A1 | 8/2005 |

* cited by examiner

*Primary Examiner* — Wing F Chan
*Assistant Examiner* — David X Yi
(74) *Attorney, Agent, or Firm* — Jefferson IP Law, LLP

(57) ABSTRACT

An apparatus and method for a universal plug and play (UPnP) service in a public network environment, the apparatus including: a UPnP multicast monitoring module to monitor a header of a frame inputted to a repeater and to request a discard of the frame; a discard control module to select and to discard the frame for which the discard has been requested; and a switching management module to register and to manage information on discarded frames.

30 Claims, 4 Drawing Sheets

APPARATUS AND METHOD FOR UPNP SERVICE IN PUBLIC NETWORK ENVIRONMENT

CROSS-REFERENCE TO RELATED APPLICATION

This application claims the benefit of Korean Patent Application No. 2006-69924 filed on Jul. 25, 2006 in the Korean Intellectual Property Office, the disclosure of which is incorporated herein by reference.

BACKGROUND OF THE INVENTION

1. Field of the Invention

Aspects of the present invention relate to an apparatus and method for a universal plug and play (UPnP) service in a public network environment, and more particularly, to an apparatus and method to construct a private network and remove unnecessary UPnP traffic in order to support the UPnP service in the public network environment such as an apartment complex.

2. Description of the Related Art

Recently, with the widespread use of the Internet and developments made in digital technologies, related industries are engaged in improving home networking technologies to connect PCs, network equipment, audio/video (AV) equipment, electronic home devices, home automation equipment, etc., at home.

Universal plug and play (UPnP) is one of the leading industrial standards in the home network field, and provides diverse UPnP services (such as searching all devices that perform UPnP functions using a UPnP device discovery function, and performing device control, media playback, and media transmission through a UPnP control point).

In the UPnP device detection process, IP multicast packets are transmitted to detect UPnP devices, and the corresponding UPnP devices respond to the packet transmission through a unicast, which is a communication system for performing communications between a single transmitter and a single receiver on a network.

FIG. 1 is a view illustrating the structure of a public network. Generally, in the network structure as illustrated in FIG. 1, public IPs and private IPs coexist in a large-scale network environment such as an apartment complex or an industrial complex. In the following description, an apartment complex structure will be exemplified.

A complex router 101 is a router or a gateway that serves to provide connections among public IPs and private IPs. In the case of transmitting data from private IPs allocated in the complex to an outside, the complex router 101 performs mapping of the data onto the public IPs having been restrictively allocated. In the case of transmitting data received through the public IPs to the private IPs, the complex router performs the mapping of the data onto the corresponding private IPs. The complex router 101 also prepares, manages, and converts a mapping table.

An apartment-unit or floor-unit connection device 102 is a device that distributes private IPs in the complex to respective households and floors of apartment buildings, and performs a switching or routing of the corresponding IPs. The connection device 102 is constructed to perform a hub function, or to perform either a switching function or a routing function, in accordance with the number of households in the complex.

A household connection device 103 performs connections with IP devices of a respective household, transmits data generated from the household to an outside, and transfers the data flowing into the household to the IP devices of the household. Generally, the household connection device 103 includes a multiplexer that operates as a repeater, a hub, and a router.

A UPnP household network 104 may be a service network that includes UPnP devices 103a for shared services using a UPnP function and can perform an automatic sharing of services and devices in an environment where an IP network is shared. The UPnP devices 103a include all IP devices and a control point having UPnP modules defined in the UPnP device architecture, and a UPnP media server, a renderer, and an AV control point defined in the UPnP AV architecture.

In FIG. 1, the defined network defines the respective households in the unit of an IP C class or a sub-class. Thus all UPnP multicast packets may be transmitted to other households through a hub, switch, router, and so forth.

However, there is a problem due to the fact that the UPnP multicast packet has a TTL (Time To Live) value of 4, and is transmitted using a multicast address. The setting of the TTL value to 4 indicates that the transmission can be performed through four routers. Accordingly, in the defined network as shown in FIG. 1, the transmitted UPnP multicast packet can reach the UPnP devices 103a of all of the households. Also, by using multicast addresses, all devices that can recognize and analyze the corresponding multicast IP can respond to the UPnP multicast packet.

Accordingly, the devices of all of the households having the UPnP modules can receive the UPnP device discovery multicast packet, respond, and transmit request packets. However, this causes a problem that the sharing of the UPnP content and the control devices is not performed in the unit of a household, but is performed in the whole unit (i.e., all of the households).

As a result, privacy (including personal privacy and a household member's content) cannot be secured, and the security of the control device cannot be guaranteed, so that the devices are exposed to serious attack.

Accordingly, in applying the UPnP to the network, a need exists for schemes to divide the household networks in order to guarantee the private protection and security in the unit of a household.

In addition, since a multicast packet is always transmitted to all ports, and devices having received the corresponding multicast packet respond using a unicast packet, this may result in whole network traffic overhead. As a result, the multicast packet is copied and transmitted to all ports, and this may cause the processing performance of the apartment-unit or floor-unit connection device 102 to deteriorate.

In order to guarantee the security of the UPnP device and prevent the performance deterioration of the UPnP device, U.S. Patent Unexamined Publication No. 2005-0240758 discloses a "controlling device on an internal network from an external network". However, the above-described problems have not yet been solved.

SUMMARY OF THE INVENTION

Aspects of the present invention provide an apparatus and a method for a universal plug and play (UPnP) service in a public network environment which secures privacy, including personal privacy and content in a unit of the public network.

Aspects of the present invention further provide an apparatus and a method for a UPnP service in a public network environment which prevents the deterioration of the performance of an apartment-unit or floor-unit connection device by reducing the occurrence of unnecessary network traffic caused by a UPnP multicast packet.

According to an aspect of the present invention, there is provided an apparatus for a universal plug and play (UPnP) service in a public network environment, the apparatus including: a UPnP multicast monitoring module to monitor an inputted frame and to request a discard of the frame if the frame is a UPnP multicast frame; a discard control module to discard the frame if the UPnP multicast monitoring module requests the discard of the frame; and a switching management module to register and to manage information on discarded frames.

According to another aspect of the present invention, there is provided a method for a universal plug and play (UPnP) service in a public network environment, the method including: monitoring an inputted frame; requesting a discard of the frame if the frame is a UPnP multicast frame; discarding the frame if the discard of the frame is requested; and registering and managing information on discarded frames.

According to an aspect of the present invention, there is provided an apparatus for a universal plug and play (UPnP) service in a public network environment, the apparatus including: a UPnP multicast monitoring module to determine if an inputted frame is a UPnP multicast frame; and a discard control module to discard the frame if the UPnP multicast monitoring module determines that the frame is the UPnP multicast frame.

According to another aspect of the present invention, there is provided a method for a universal plug and play (UPnP) service in a public network environment, the method including: determining whether an inputted frame is a UPnP multicast frame; and discarding the frame if the frame is determined to be the UPnP multicast frame.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
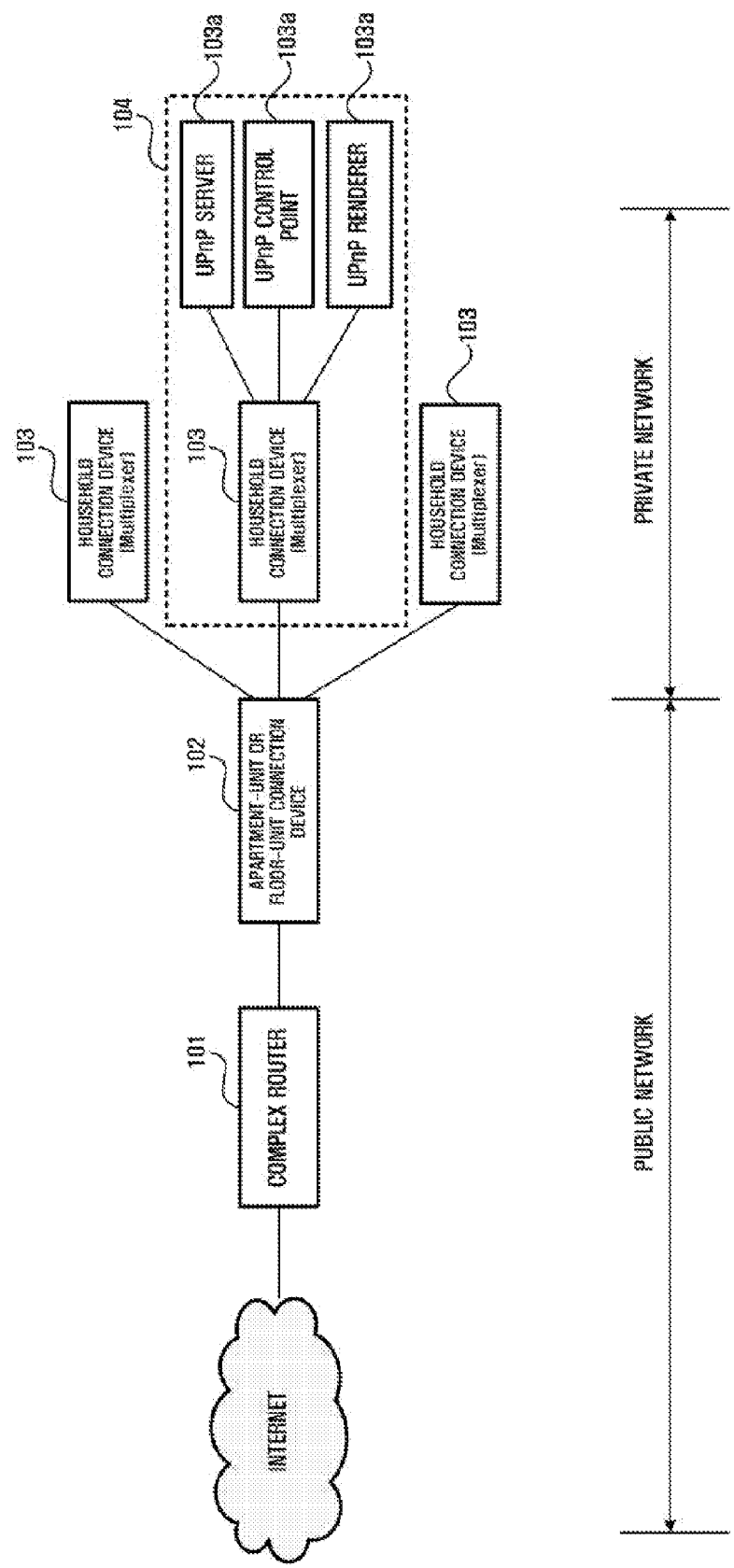
FIG. 1 is a view illustrating the structure of a public network.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will be described herein with reference to the accompanying drawings illustrating block diagrams and flowcharts to explain an apparatus and method for a UPnP service in a public network environment according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create devices and/or methods to implement the functions specified in the flowchart block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer-implemented process such that the instructions that execute on the computer or other programmable apparatus provide operations to implement the functions specified in the flowchart block or blocks.

Also, each block of the flowchart illustrations may represent a module, segment, or portion of code, which comprises one or more executable instructions to implement the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
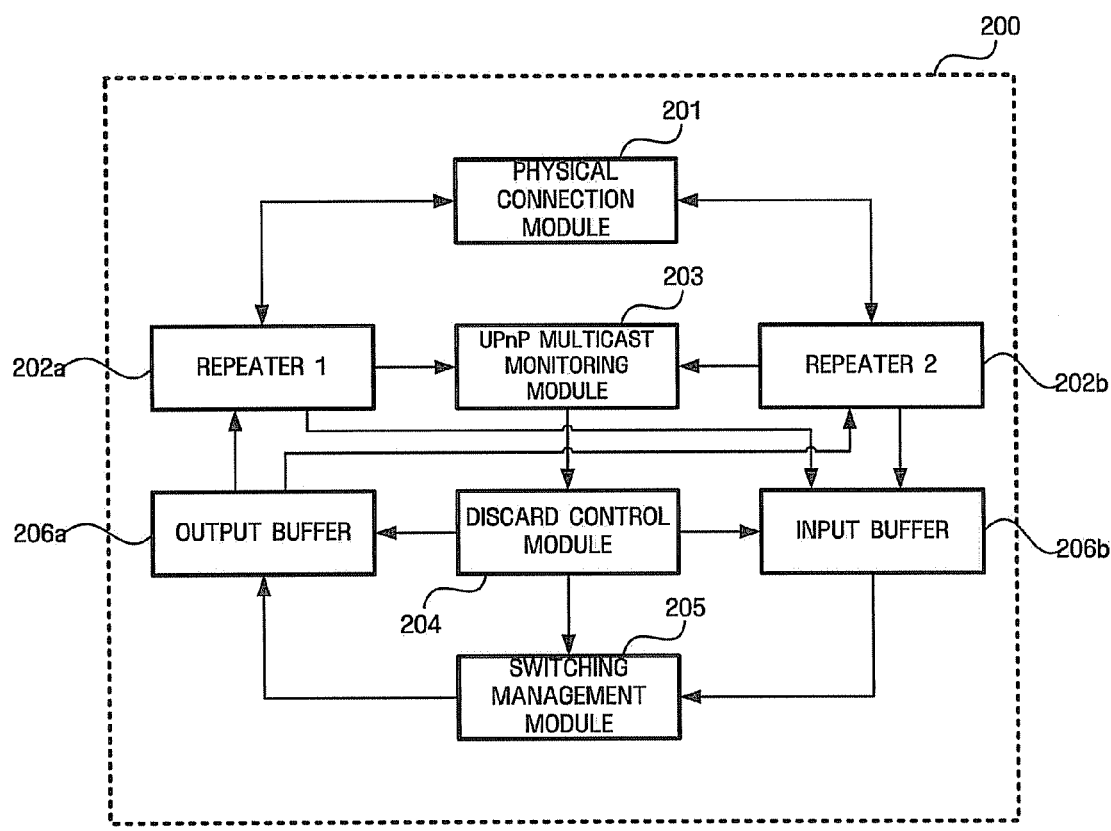
FIG. 2 is a block diagram illustrating the construction of an apparatus for a UPnP service in a public network environment according to an embodiment of the present invention.

FIG. 2 is a block diagram illustrating the construction of an apparatus 200 for a UPnP service in a public network environment according to an embodiment of the present invention. In FIG. 2, an apartment-unit or floor-unit connection device, or a household connection device, having a universal plug and play (UPnP) multicast interception function is illustrated. It is understood that aspects of the present invention are not limited to households or apartments and can be applied to any UPnP service in a public network environment.

The function of the apparatus 200 as illustrated in FIG. 2 is based on a LAN switch. However, it can also be applied to the apartment-unit or floor-unit connection device, or household connection device, having a MAC address conversion function or more.

The apparatus 200 for a UPnP server in a public network environment includes a physical connection module 201 connecting with external cables of respective units of the public network (such as households, offices, classrooms, etc.), repeaters 202a and 202b through which network signals having compatibility (such as 10Base-T and 100Base-T) are transmitted and/or received, a UPnP multicast monitoring module 203 monitoring a specified necessary part of a frame inputted to the repeaters 202a and 202b and requesting a discard of the frame, a discard control module 204 selecting and discarding the frame of which the discard has been requested, a switching management module 205 registering and managing information on the discarded frames, and buffers 206a and 206b storing the transmitted frame or converting the transmitted frame into a necessary frame size to transmit the converted frame since the repeaters 202a and 202b require transmitted frames of different sizes. Households will be used in the following descriptions as an example of the units (private networks) of the public network.

The term "module", as used herein, refers to, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The physical connection module 201 connects to corresponding cables so that data is transmitted to an outside or to other households. Since respective connection parts of the physical connection module 201 are ports that perform a bridge function, the physical connection module 201 manages which devices are connected to segments that are connected to the ports.

The UPnP multicast monitoring module 203 performs monitoring of one or more of a UPnP IP and a UPnP MAC address of a frame inputted to the repeater. If the corresponding UPnP IP and/or the UPnP MAC address are not found, the UPnP multicast monitoring module 203 stops the monitoring and waits for the next frame in order to monitor the next frame.

If the UPnP IP and/or the UPnP MAC address are found, the UPnP multicast monitoring module 203 transfers information on the corresponding frame to the discard control module 204, so that the discard control module 204 discards the corresponding UPnP multicast frame.

If the UPnP multicast frame to be discarded is stored in the buffers 206a and 206b, the discard control module 204 discards the UPnP multicast frame stored in the buffers. Alternatively, if the UPnP multicast frame to be discarded is located in the switching management module 205 without being stored in the buffers 206a and 206b, the discard control module 204 searches for and discards the corresponding frame. In order to search for the corresponding frame, the discard control module 204 may receive necessary information from the UPnP multicast monitoring module 203.

The switching management module 205 registers and manages the information on the corresponding frame to be discarded, in addition to changing the header value of the input frame to the header value of the frame intended to be outputted.

Figure 3:
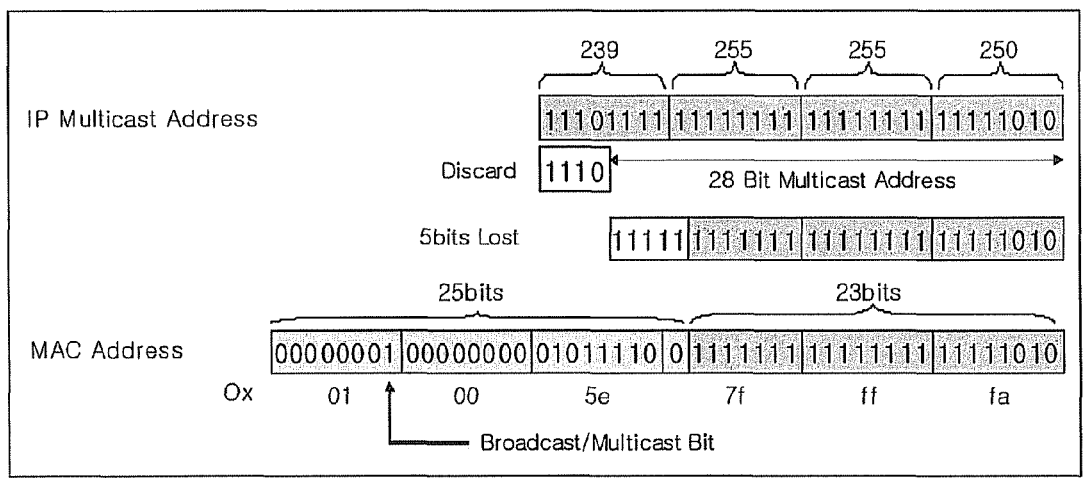
FIG. 3 is a view illustrating the result of converting a MAC address of a UPnP multicast IP according to an embodiment of the present invention.

FIG. 3 is a view illustrating the result of converting a MAC address of a UPnP multicast IP according to an embodiment of the present invention. Referring to FIG. 3, the UPnP multicast IP is determined to be transmitted using the class D IP address 239.255.255.250:1900. Accordingly, in order to transmit the UPnP multicast IP to an IEEE 802.3 network, the IEEE 802.3 MAC address is converted into an address structure of 0x 01-00-5e-7f-ff-fa. The frame having the destination address structure of 0x 01-00-5e-7f-ff-fa is transferred to all devices existing in the corresponding network.

Figure 4:
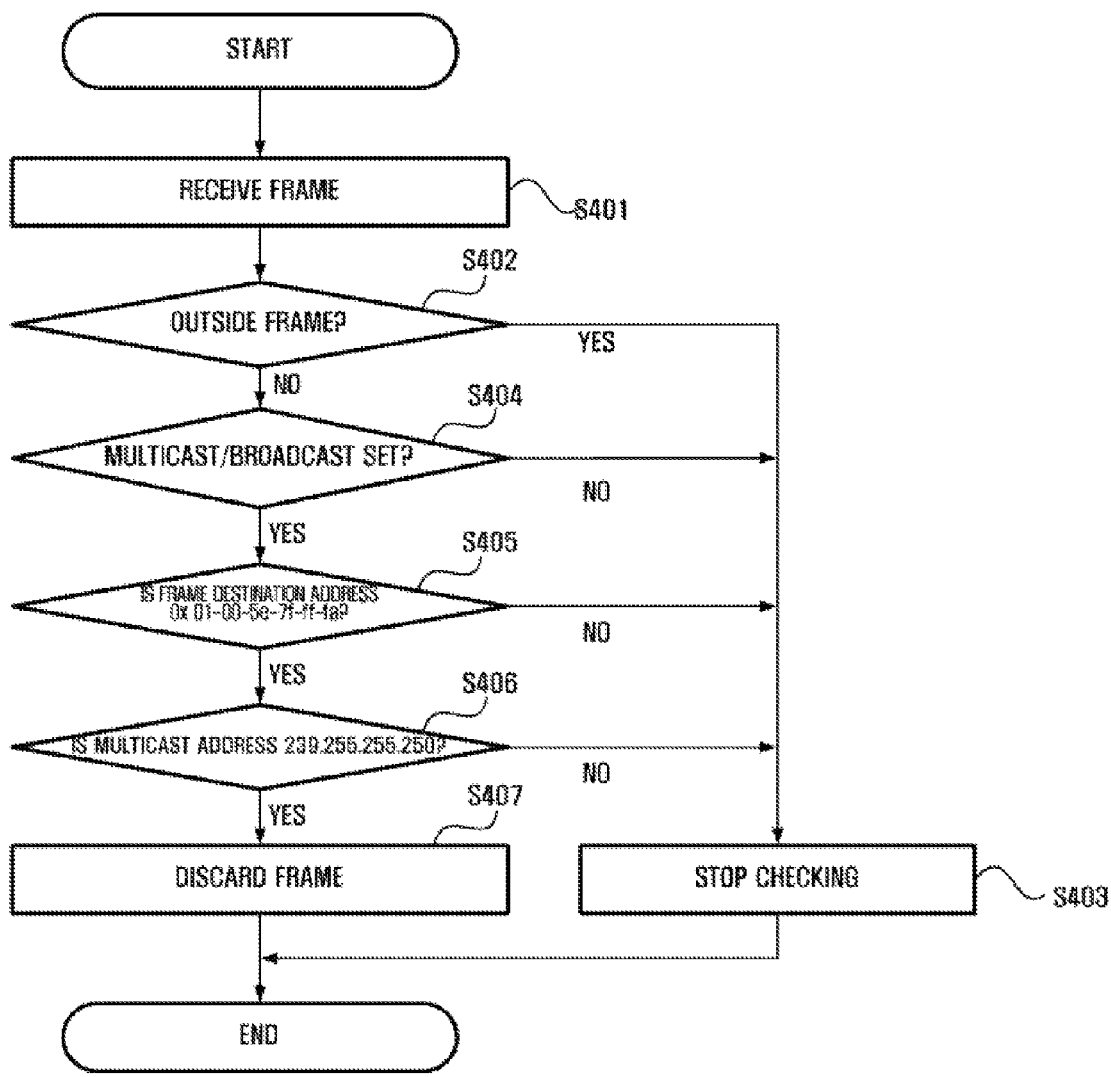
FIG. 4 is a flowchart illustrating a method for a UPnP service in a public network environment according to an embodiment of the present invention.

FIG. 4 is a flowchart illustrating a method for a UPnP service in a public network environment according to an embodiment of the present invention. Referring to FIGS. 2 and 4, the physical connection module 201 receives a frame, and the received frame passes through the corresponding repeater 202 (operation S401).

Next, the UPnP multicast monitoring module 203 decides whether the received frame is a UPnP-related frame or a frame incoming from an outside by monitoring the received frame (operation S402).

If the received frame is incoming from an outside, then the received frame does not relate to the UPnP multicast frame. Accordingly, the UPnP multicast monitoring module 203 stops monitoring the corresponding frame, and proceeds to monitor the next frame (operation S403).

If the received frame is a UPnP-related frame, the UPnP multicast monitoring module 203 monitors a multicast/broadcast bit of the communication address (such as the IEEE 802.3 MAC address), as shown in FIG. 3, (operation S404) since this bit has been set in the UPnP multicast IP.

If the corresponding bit has not been set, then the corresponding frame does not have the UPnP multicast IP. In this case, the UPnP multicast monitoring module 203 stops monitoring the corresponding frame and proceeds to monitor the next frame.

On the other hand, if the corresponding bit has been set, the UPnP multicast monitoring module 203 checks whether the destination address of the frame coincides with the corresponding UPnP MAC address by monitoring the destination address of the frame (operation S405).

As shown in FIG. 3, the UPnP MAC address has an address structure of 0x 01-00-5e-7f-ff-fa. If the MAC address of the received frame does not have the address structure of 0x 01-00-5e-7f-ff-fa, the UPnP multicast monitoring module 203 stops the current monitoring, and proceeds to monitor the next frame.

If the UPnP MAC address has the address structure of 0x 01-00-5e-7f-ff-fa, the UPnP multicast monitoring module 203 monitors the destination address of the IP header part (operation S406).

The destination address field of the UPnP IP header has the IP address 239.255.255.250. That is, 239.255.255.250 is the standard destination IP address of UPnP traffic. Since the UPnP multicast address is unique, if the currently monitored frame has the UPnP multicast address in the destination address field, then the frame is the UPnP multicast frame.

If the destination address of the corresponding IP header is not 239.255.255.250, the UPnP multicast monitoring module 203 stops the corresponding monitoring, and proceeds to monitor the next frame.

If the currently monitored frame is the UPnP multicast frame (i.e., the UPnP multicast monitoring module 203 determines that the destination IP address of the frame is 239.255.255.250 in operation S406), then the frame may be discarded from the buffers 206a and 206b or the switching management module 205. In this case, the UPnP multicast monitoring module 203 transmits information required to discard the corresponding frame to the discard control module 204, and proceeds to monitor the next frame.

As described above, according to the apparatus and method for a UPnP service in a public network environment according to aspects of the present invention, one or more of the following effects can be achieved. Private networks are constructed in units of a public network in order to support the UPnP service in a public network environment shared by many units, and thus privacy (including personal privacy and a unit member's content) can be secured. Furthermore, the occurrence of unnecessary network traffic caused by a UPnP multicast packet is reduced, and thus the deterioration of the performance of, for example, an apartment-unit or floor-unit connection device can be prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for a universal plug and play (UPnP) service in a public network environment, the apparatus comprising:
    a UPnP multicast monitoring module to monitor an inputted frame and to request a discard of the frame if the frame is a UPnP multicast frame;
    a discard control module to discard the frame if the UPnP multicast monitoring module requests the discard of the frame; and
    a switching management module to register and to manage information on discarded frames,
    wherein the UPnP multicast monitoring module
        determines whether the frame is inputted from an outside of the public a private network and, if the frame is determined to be inputted from the outside, determines that the frame is not related to the UPnP multicast frame, and
        if the frame is not determined to be inputted from an outside, determines whether a multicast and/or a broadcast bit is set in a UPnP multicast IP, and, if the multicast and/or broadcast bit is set in the UPnP multicast IP, determines that the inputted frame is the UPnP multicast frame, and
    wherein at least one of the UPnP multicast monitoring module, the discard control module and the switching management module is a hardware component.

2. The apparatus as claimed in claim 1, wherein the UPnP multicast monitoring module monitors a header of the inputted frame to determine if the frame is the UPnP multicast frame.

3. The apparatus as claimed in claim 1, wherein the frame is inputted to a repeater.

4. The apparatus as claimed in claim 2, wherein, when the UPnP multicast monitoring module determines that the frame is not inputted from the outside, the UPnP multicast monitoring module determines whether a UPnP IP is comprised in the header of the frame to determine if the frame is the UPnP multicast frame.

5. The apparatus as claimed in claim 2, wherein, when the UPnP multicast monitoring module determines that the frame is not inputted from the outside, the UPnP multicast monitoring module determines whether a UPnP MAC address is comprised in the header of the frame to determine if the frame is the UPnP multicast frame.

6. The apparatus as claimed in claim 1, wherein the discard control module discards the frame stored in a buffer if the frame to be discarded is stored in the buffer.

7. The apparatus as claimed in claim 1, wherein the discard control module discards the frame stored in the switching management module if the frame to be discarded is stored in the switching management module.

8. The apparatus as claimed in claim 1, wherein the UPnP multicast monitoring module stops monitoring the frame if the UPnP multicast monitoring module determines that the frame is not the UPnP multicast frame.

9. The apparatus as claimed in claim 1, wherein the apparatus is a household connection device.

10. The apparatus as claimed in claim 1, wherein the apparatus is an apartment-unit or floor-unit connection device.

11. A method for a universal plug and play (UPnP) service in a public network environment, the method comprising:
    monitoring an inputted frame, the monitoring of the inputted frame including:
        determining whether the frame is inputted from an outside of a private network,
        if the frame is determined to be inputted from the outside, determining that the frame is not related to a UPnP multicast frame, and
        if the frame is not determined to be inputted from the outside, determining whether a multicast and/or broadcast bit is set in a UPnP multicast IP of the frame, and if the multicast and/or broadcast bit is set in the UPnP multicast IP of the frame, determining that the frame is the UPnP multicast frame;
    requesting, by an apparatus for the UPnP service, a discard of the frame if the frame is the UPnP multicast frame;
    discarding the frame if the discard of the frame is requested; and
    registering and managing information on discarded frames.

12. The method as claimed in claim 11, wherein the monitoring of the inputted frame comprises:
    monitoring a header of the inputted frame to determine if the frame is the UPnP multicast frame.

13. The method as claimed in claim 11, wherein the frame is inputted to a repeater.

14. The method as claimed in claim 12, wherein the monitoring of the header of the inputted frame comprises:
    when the inputted frame is determined not to be inputted from the outside, determining whether a UPnP IP is comprised in the header of the frame to determine if the frame is the UPnP multicast frame.

15. The method as claimed in claim 12, wherein the monitoring of the header of the inputted frame comprises:
    when the inputted frame is determined not to be input from the outside, determining whether a UPnP MAC address is comprised in the header of the frame to determine if the frame is the UPnP multicast frame.

16. The method as claimed in claim 11, wherein the discarding of the frame comprises:
    discarding the frame stored in a buffer if the frame to be discarded is stored in the buffer.

17. The method as claimed in claim 11, wherein the discarding of the frame comprises:
    discarding the frame stored in a switching management module if the frame to be discarded is stored in the switching management module.

18. The method as claimed in claim 11, further comprising:
    stopping a monitoring of the frame if the frame is determined to not be the UPnP multicast frame.

19. An apparatus for a universal plug and play (UPnP) service in a public network environment, the apparatus comprising:
    a UPnP multicast monitoring module to determine if an inputted frame is a UPnP multicast frame, to determine whether the frame is inputted from an outside of a private network, to determine, if the frame is inputted from the outside, that the inputted frame does not relate to the UPnP multicast frame, to determine, if the frame is not inputted from the outside of the public network, whether a multicast and/or a broadcast bit is set in a UPnP multicast IP of the inputted frame, and to determine that the inputted frame is the UPnP multicast frame when the multicast and/or the broadcast bit is set in the UPnP multicast IP; and a discard control module to discard the frame if the UPnP multicast monitoring module determines that the frame is the UPnP multicast frame, wherein at least one of the UPnP multicast monitoring module and the discard control module is a hardware component.

20. The apparatus as claimed in claim 19, further comprising:

a switching management module to register and to manage information on discarded frames.

21. The apparatus as claimed in claim 19, wherein the UPnP multicast monitoring module requests a discard of the frame if the UPnP multicast monitoring module determines that the frame is the UPnP multicast frame.

22. The apparatus as claimed in claim 19, wherein the UPnP multicast monitoring module monitors a header of the inputted frame to determine if the frame is the UPnP multicast frame.

23. The apparatus as claimed in claim 22, wherein the UPnP multicast monitoring module determines whether a UPnP IP is comprised in the header of the frame to determine if the frame is the UPnP multicast frame.

24. The apparatus as claimed in claim 22, wherein the UPnP multicast monitoring module determines whether a UPnP MAC address is comprised in the header of the frame to determine if the frame is the UPnP multicast frame.

25. A method for a universal plug and play (UPnP) service in a public network environment, the method comprising:

determining, by an apparatus for the UPnP service, whether an inputted frame is a UPnP multicast frame; and discarding the frame if the frame is determined to be the UPnP multicast frame, wherein the determining of whether the inputted frame is the UPnP multicast frame comprises:

determining whether the frame is inputted from an outside of a private network, if the frame is determined to be inputted from the outside, determining that the frame is not related to the UPnP multicast frame if the frame is determined to be inputted from the outside, if the frame is not determined to be inputted from the outside, determining whether a multicast and/or broadcast bit is set in a UPnP multicast IP of the frame, and if the multicast and/or broadcast bit is set in the UPnP multicast IP of the frame, determining that the frame is the UPnP multicast frame.

26. The method as claimed in claim 25, further comprising:

registering and managing information on discarded frames.

27. The method as claimed in claim 25, further comprising:

requesting a discard of the frame if the frame is determined to be the UPnP multicast frame.

28. The method as claimed in claim 25, wherein the determining of whether the inputted frame is the UPnP multicast frame comprises:

monitoring a header of the inputted frame to determine if the frame is the UPnP multicast frame.

29. The method as claimed in claim 28, wherein the monitoring of the header of the inputted frame comprises:

determining whether a UPnP IP is comprised in the header of the frame to determine if the frame is the UPnP multicast frame.

30. The method as claimed in claim 28, wherein the monitoring of the header of the inputted frame comprises:

determining whether a UPnP MAC address is comprised in the header of the frame to determine if the frame is the UPnP multicast frame.

* * * * *